United States Patent [19]

Archibald

[11] Patent Number: 5,490,720
[45] Date of Patent: Feb. 13, 1996

[54] VEHICLE WHEEL HAVING A TINNERMAN NUT CLEARANCE GROOVE

[75] Inventor: Kenneth R. Archibald, Canton, Mich.

[73] Assignee: Hayes Wheels International, Inc., Romulus, Mich.

[21] Appl. No.: 187,944

[22] Filed: Jan. 27, 1994

[51] Int. Cl.⁶ ........................................ B60B 3/16
[52] U.S. Cl. .................. 301/35.62; 301/65; 29/894.323
[58] Field of Search ................ 301/35.54, 35.57, 301/35.62, 63.1, 65, 111, 114; 29/894.3, 894.32, 894.325, 894.36, 894.362; 172/27 R, 27 C, 29

[56] References Cited

U.S. PATENT DOCUMENTS

| | | | |
|---|---|---|---|
| 1,812,437 | 6/1931 | Hunt | 29/894.323 X |
| 2,453,512 | 11/1948 | Jacobi | 301/35.62 |
| 3,138,407 | 6/1964 | Duggan | 301/35.62 X |
| 3,729,795 | 5/1973 | Roper | 29/894.323 |
| 3,884,527 | 5/1975 | Clary | 301/65 |
| 4,456,308 | 6/1984 | Opel et al. | 301/35.62 |
| 5,292,182 | 3/1994 | Kanazawa et al. | 301/65 |

FOREIGN PATENT DOCUMENTS

| | | | |
|---|---|---|---|
| 2052402 | 1/1981 | United Kingdom . | |
| 2108914 | 5/1983 | United Kingdom | 301/35.62 |

Primary Examiner—Russell D. Stormer
Attorney, Agent, or Firm—MacMillan, Sobanski & Todd

[57] ABSTRACT

A vehicle wheel having an annular clearance groove formed in an inboard surface of a center hub. A plurality of stud holes extend through the hub to the clearance groove. The stud holes receive wheel studs when the wheel is attached to a vehicle. The clearance groove receives any tinnerman nuts which are attached to the wheel studs.

19 Claims, 4 Drawing Sheets

VEHICLE WHEEL HAVING A TINNERMAN NUT CLEARANCE GROOVE

BACKGROUND OF THE INVENTION

This invention relates in general to vehicle wheels and in particular to a vehicle wheel having an annular tinnerman nut clearance groove.

Referring to the drawings, there is shown in FIG. 1 a sectional view of a typical vehicle wheel, indicated generally at 10, which is formed in accordance with the prior art. The prior art wheel 10 includes an annular wheel rim 11 formed about a wheel axis 12. The rim 11 is adapted to carry a vehicle tire (not shown). The wheel 10 further includes a circular wheel disk 13 formed across one end of the wheel rim 11. The wheel disk 13 has a plurality of radial spokes 14, one of which is shown in FIG. 1, connecting the wheel rim 11 to a wheel hub 15. The spokes 14 define a plurality of openings 16 formed through the wheel disk 13. The openings 16 allow a flow of cooling air to the vehicle brakes while reducing the weight of the wheel 10.

The wheel hub 15 has a recessed center 17. The hub center 17 includes an inboard, or mounting, surface 18, which is perpendicular to the wheel axis 12 and faces the vehicle when the wheel 10 is mounted thereon. The hub center 17 also has an outboard surface 19 which is opposite from the mounting surface 18 and faces away from the vehicle when the wheel 10 is mounted thereon.

An enlarged plan view of the hub mounting surface 18 is shown in FIG. 2. The mounting surface 18 is machined flat to assure supportive contact between the wheel 10 and the surface of an adjacent vehicle suspension component (not shown), such as an axle hub, brake drum or brake rotor.

As shown in FIGS. 2 and 3, a center pilot hole 20, which is adapted to receive the end of a vehicle hub (not shown), is formed through the center of the wheel hub 15. The hub 15 also includes a plurality of stud holes 21 formed therethrough. The stud holes 21 are spaced equally about a circle 22 which is concentric with the pilot hole 20. The stud holes 21 receive threaded wheel studs (not shown) for securing the wheel 10 to the vehicle suspension component. Optional lightener pockets 23 can be formed in the hub mounting surface 18 between the stud holes 21 to reduce the weight of the wheel 10.

The wheel hub 15 further includes a shallow cylindrical recess 25 formed in the mounting surface 18 concentric with each stud hole 21. Each recess 25 defines a cylindrical surface 26 which extends axially into the mounting surface 18. The cylindrical surface 26 forms a ring-shaped shoulder 28 with the stud hole 21. The recesses 25 provide clearance for tinnerman nuts (not shown) when the wheel 10 is mounted upon a vehicle adjacent to a brake drum. Tinnerman nuts typically are wire nuts about one mm high and 25 mm in diameter which are screwed onto the wheel studs to secure a brake drum or brake rotor to an axle hub during vehicle assembly. Accordingly, the tinnerman nuts extend outwardly from the surface of the brake drum. The recesses 25 have a diameter that is greater than the tinnerman nut diameter and a depth that is greater that the tinnerman nut height. Thus, when the wheel 10 is mounted upon the vehicle, the cylindrical recesses 25 receive the tinnerman nuts, allowing the hub mounting surface 18 to fully contact the adjacent brake drum surface.

The wheel 10 can be formed by a casting operation wherein a molten metal, such as aluminum, magnesium or titanium, an alloy of a metal, or a polymer is fed into a multi-piece wheel mold. Alternatively, the wheel 10 can be formed by a forging operation wherein a heated metal billet is pressed between a pair of dies. It is known in the art to form the cylindrical recesses 25 during the forming operation. Following forming, the hub mounting surface 18 and a portion of the inside surface 11A of the wheel rim 11 are finished by a machining operation, such as turning the wheel 10 upon a lathe. The pilot hole 20 and the stud holes 21 are then drilled through the hub 15 from the outboard surface 19 with each stud hole 21 centered upon a corresponding recess 25.

Alternatively, the wheel 10 can be formed without the cylindrical recesses 25. When this is done, the hub mounting surface 18 and the rim surface portion 11A are finished as before. The pilot hole 20 and the stud holes 21 are drilled through the hub 15. Then the wheel 10 is turned over and the cylindrical recesses 25 are counterbored into the inboard end of each of the stud holes 21. It is also known to form a stud hole 21 and cylindrical recess 25 with a single combined drilling and milling operation. However, this combined operation requires a special drilling machine and tooling and is time consuming.

Vehicle wheels can also be fabricated by assembling individual components. A fabricated wheel typically includes a wheel disk that is formed from a metal, such as steel or aluminum, by a stamping, casting or forging operation. Openings in a stamped wheel disk, including stud holes, are punched through the wheel disk and concentric rings are formed around the stud holes to allow clearance of tinnerman nuts. Openings and recesses in a cast or forged wheel disk are formed as described above for a cast or forged wheel. A wheel rim is typically rolled from metal strip stock into an annular shape. Alternatively, the wheel rim can be forged or stamped. The wheel disk is attached to the wheel rim to produce a fabricated wheel.

SUMMARY OF THE INVENTION

This invention relates to an improved vehicle wheel having a clearance groove for tinnerman nuts formed on a hub inboard surface and a method for forming the groove.

As described above, prior art vehicle wheels include a plurality of cylindrical recesses 25 formed at the inboard ends of the stud holes 21. However, because the stud holes 21 are drilled from the hub outboard surface 19, it has been found difficult to drill the stud holes 21 concentric with the cylindrical recesses 25 when the recesses 25 are cast or forged into the hub mounting surface 18. A non-concentric stud hole 28 is illustrated by the dashed circle in the upper portion of FIG. 2. The non-concentric stud hole 28 defines an axis 29 which does intersect the circle 22 and is not concentric with the corresponding recess surface 26. Accordingly, as shown in FIG. 2, the ring-shaped shoulder 27 has a variable width with a portion of the recess cylindrical surface 26 being relatively close to the stud hole 21. When the wheel is mounted upon a vehicle, the non-concentric stud hole 28 receives a wheel stud. However, the portion of the cylindrical surface 26 which is closest to the non-concentric stud hole 28 can prevent the recess 25 from receiving the tinnerman nut carried by the wheel stud. This can result in an interference between the tinnerman nut and the mounting surface 18, which can cause undesired vibration when the wheel 10 rotates.

Alternatively, if the recesses 25 are not cast or forged into the mounting surface 18, it is necessary to counterbore or mill them into the hub 15. However, while the alternative method for forming recesses 25 assures that the recesses 25 are concentric with the stud holes 21, an additional machining operation is required, increasing the time and cost of manufacture. Additionally, the machining of the recesses 25 can form burrs along the edges of the recesses. These burrs can cause interference between the brake drum or rotor and the hub mounting surface 18.

The present invention concerns forming an annular clearance groove in the wheel hub mounting surface which is concentric with the wheel axis and has sufficient width and depth to clear the tinnerman nuts. The clearance groove can be machined into the mounting surface of a cast or forged wheel with the lathe when the hub mounting surface and rim surface portion are finished. This avoids an additional machining step and the associated tooling used to form cylindrical recesses in the prior art wheel. When the clearance groove is machined into the surface, the sides of the groove can be beveled to eliminate burrs. Alternatively, an annular recess can be cast or formed into the hub mounting surface. The stud holes are then drilled through the hub center equally circumferentially spaced about a circle that is concentric with the clearance groove.

The present invention also contemplates machining or forming a clearance ring in the inboard surface of a stamped wheel hub. The clearance ring can be machined by a conventional process, such as turning on a lathe as described above. Alternatively, the clearance ring can be formed during the stamping operation.

Thus, the present invention provides clearance for tinnerman nuts while reducing machining time and costs for cast wheels.

Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
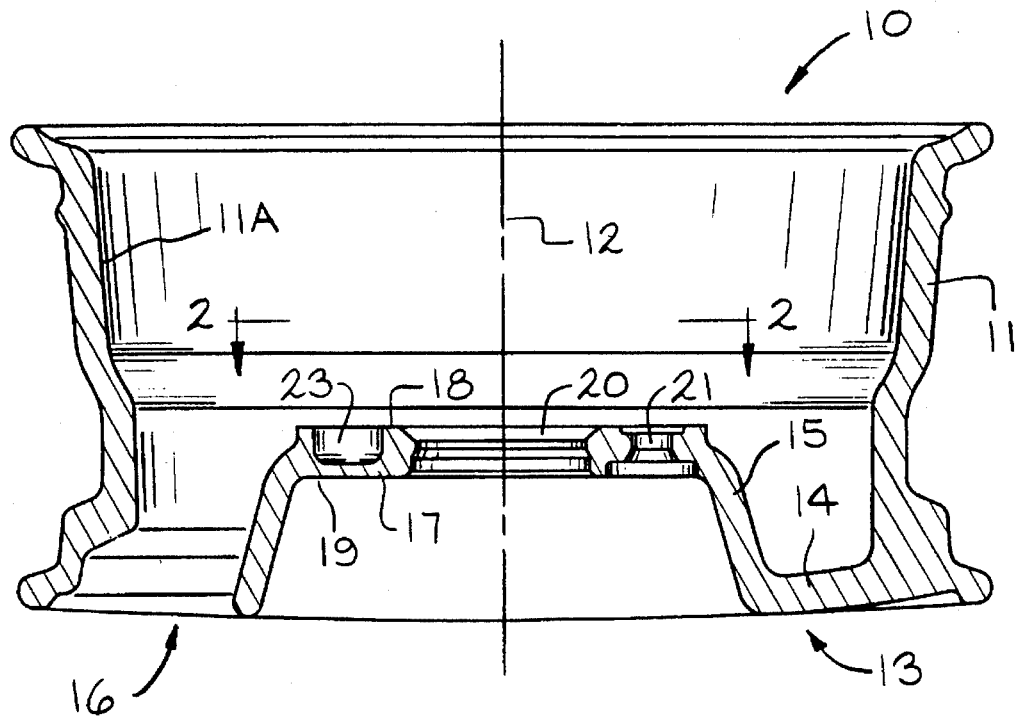
FIG. 1 is a sectional view of a prior art cast wheel.
Figure 4:
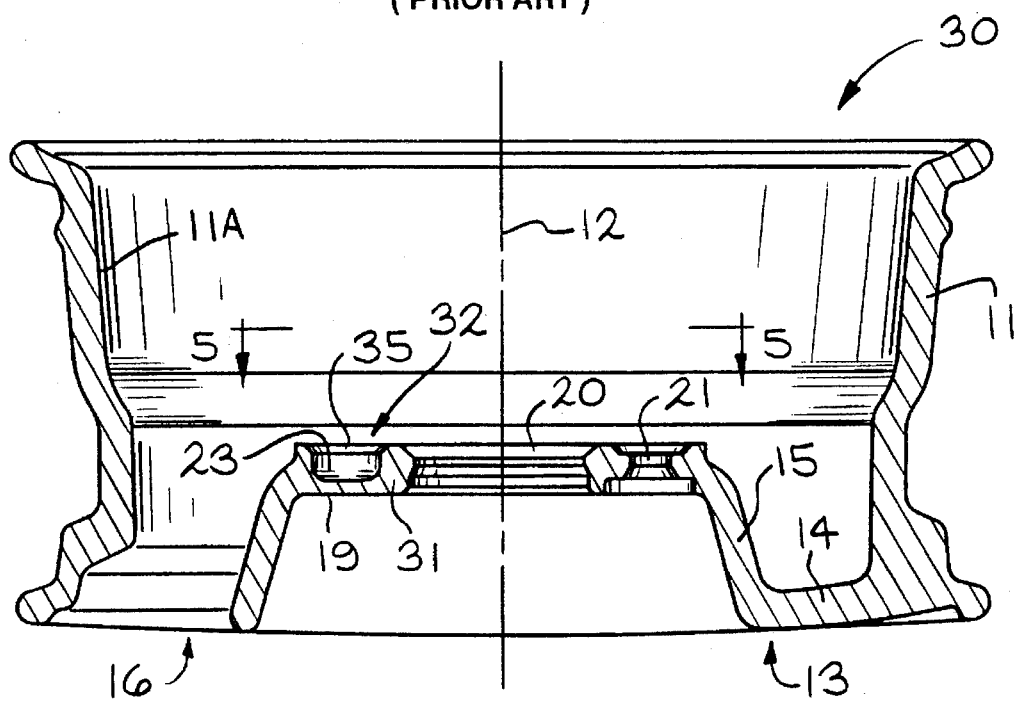
FIG. 4 is a sectional view of a wheel formed in accordance with the invention.
Figure 2:
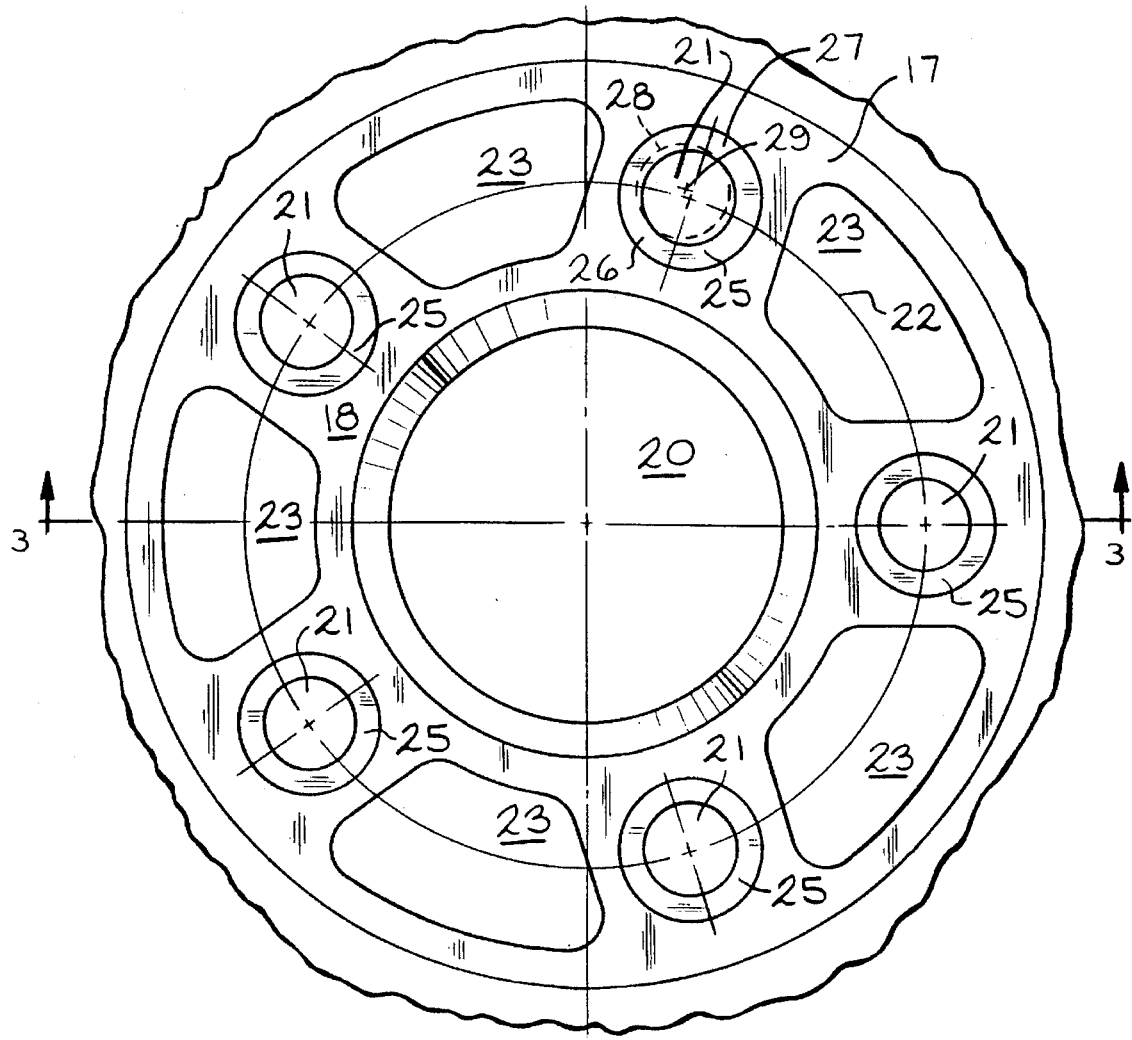
FIG. 2 is a fragmentary view taken along line 2—2 in FIG. 1.
Figure 3:
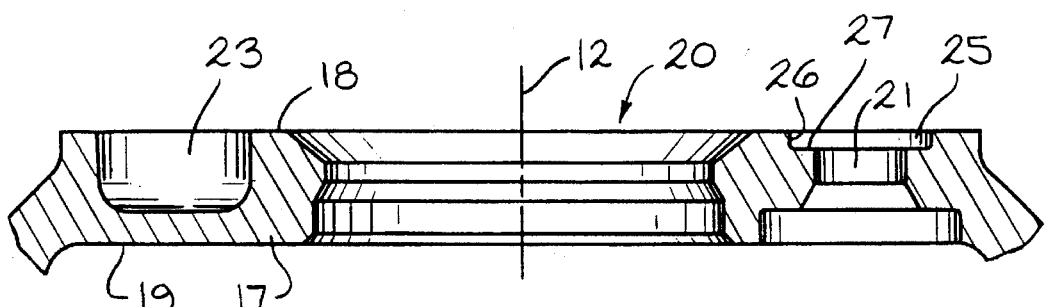
FIG. 3 is a fragmentary sectional view taken along line 3—3 in FIG. 2.

Referring now to FIG. 4, there is shown a sectional view of an improved wheel 30, formed in accordance with the invention. Portions of the improved wheel 30 which are the same as the prior art wheel 10 are identified by the same numerical indicator.

It will be appreciated that, while the drawings show a one piece wheel, the invention can be practiced upon a component of a fabricated wheel, such as, for example, a center spider (not shown) which is then secured to a separately formed rim (not shown) in a known manner to form a finished wheel. The fabricated wheel also can include a full front face of a wheel which is subsequently secured to a formed partial wheel rim. Thus, as used in this description and the following claims, the term "wheel" includes both a one-piece cast wheel and a component of a fabricated wheel.

The improved wheel 30 includes an annular wheel rim 11 formed about a wheel axis 12. The rim 11 is adapted to carry a vehicle tire (not shown). The improved wheel 30 further includes a circular wheel disk 13 formed across one end of the wheel rim 11. It will be appreciated that the wheel disk 13 also can be offset axially from the end of the wheel rim 11. The wheel disk 13 has a plurality of radial spokes 14, one of which is shown in FIG. 4, connecting the wheel rim 11 to a wheel hub 15. The spokes 14 define a plurality of openings 16 formed through the wheel disk 13.

Figure 5:
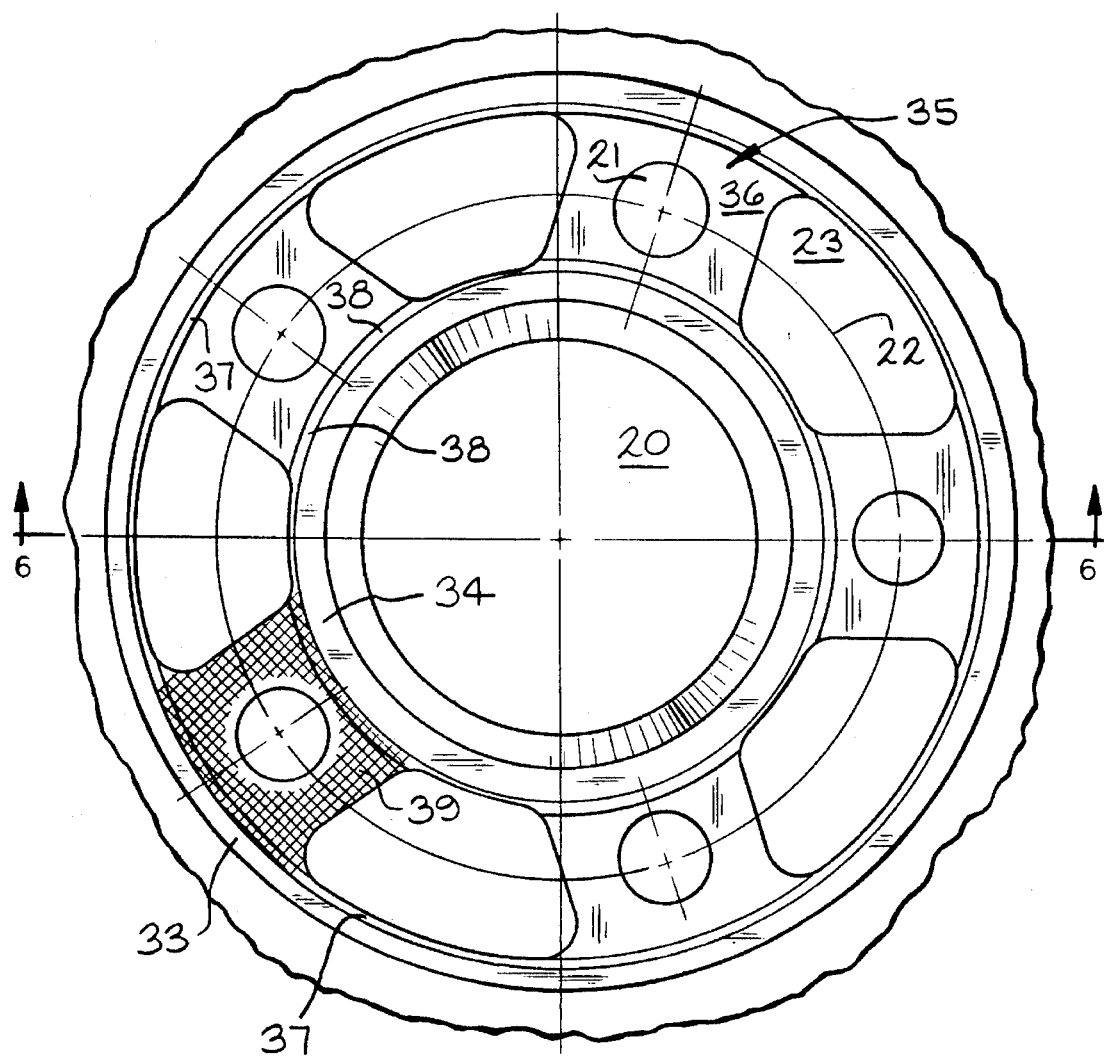
FIG. 5 is a fragmentary view taken along line 5—5 in FIG. 4.

The wheel hub 15 has a recessed center 31. The hub center 31 includes an inboard surface 32, which is generally perpendicular to the wheel axis 12 and faces the vehicle when the improved wheel 30 is mounted thereon. The hub center 31 also has an outboard surface 19 which is opposite from the inboard surface 32 and faces away from the vehicle when the wheel 30 is mounted thereon. An enlarged plan view of the hub inboard surface 32 is shown in FIG. 5. The inboard surface 32 includes a pair of ring-shaped mounting surfaces 33 and 34 which are concentric with a pilot hole 20. The mounting surfaces 33 and 34 are machined flat and have sufficient surface area to assure supportive contact between the wheel 30 and the surface of a vehicle suspension component (not shown), such as an axle hub, brake drum or brake rotor.

Figure 6:
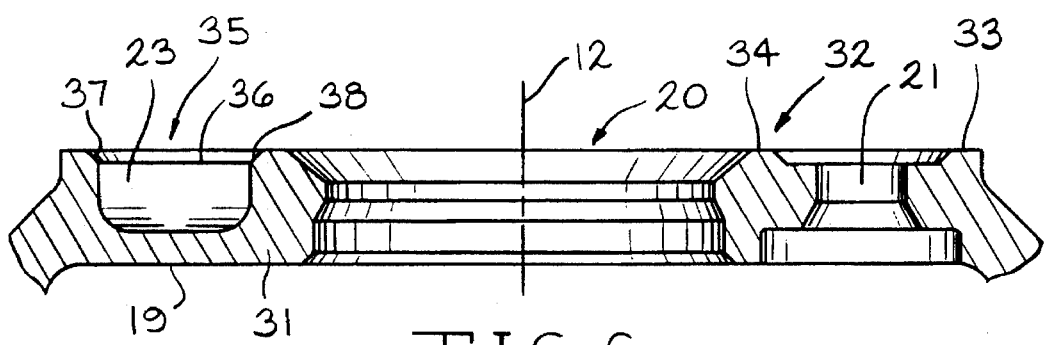
FIG. 6 is a fragmentary sectional view taken along line 6—6 in FIG. 5.

The mounting surfaces 33 and 34 are separated by an annular clearance groove 35 which is formed in the hub inboard surface 32 concentric with the wheel axis 12. As shown in FIG. 6, the clearance groove 35 has a bottom surface 36 that is offset into the hub center 31 from the mounting surfaces 33 and 34. In the preferred embodiment, the bottom surface is flat and parallel to the mounting surfaces 33 and 34. The width of the groove bottom surface 36 is greater than the diameter of a tinnerman nut. Similarly, the depth of the groove 35 is greater than the height of a tinnerman nut. In the preferred embodiment, the groove 35 has beveled sides 37 and 38, however, the groove 35 can be formed without beveled sides.

A plurality of optional lightener pockets 23 extend into the wheel hub 31 from the clearance groove bottom surface 36. The lightener pockets 23 provide a means for lightening the wheel and are spaced equally circumferentially about the clearance groove 35. It will be appreciated that the lightener pockets also can be formed extending into the wheel hub 31 from the outboard surface 19 thereof.

A plurality of stud holes 21 extend through the wheel hub 31 from the clearance groove bottom surface 36. The stud holes 21 are spaced equally circumferentially about a circle 22 which is concentric with and centered within the clearance groove 35. Because the clearance groove 35 is concentric with the wheel axis 12, the circle 22 is also concentric with the wheel axis 12. As shown in FIG. 5, the stud holes 21 alternate with the lightener pockets 23. The stud holes 21 are adapted to receive wheel studs (not shown). The outboard stud hole ends are shown in the figures as being counterbored and countersunk to receive wheel attachment nuts (not shown) for securing the wheel 30 to a vehicle. However, the counterboring and countersinking is optional and can be omitted.

In FIG. 5, the clearance groove 35 is illustrated as being as wide as the lightener pockets 23. However, it will be appreciated that the clearance groove 35 need only be sufficiently wide to receive the particular tinnerman nut being used. Thus, the groove 35 can be narrower or wider than shown in the figures. It also will be appreciated that the circle 22 does not have to be centered upon the clearance groove 35, provided, as will be discussed below, there is sufficient clearance for the tinnerman nuts. Because additional material, indicated by a cross-hatched area 39 in FIG. 5, is removed from the wheel hub 31 when the clearance groove 35 is formed, the improved wheel 30 weighs less than the prior art wheel 10 described above.

When the improved wheel 30 is mounted upon a vehicle adjacent to a brake drum or brake rotor, the clearance groove 35 receives any tinnerman nuts that are securing the brake drum to the vehicle suspension. The clearance groove 35 assures that the hub mounting surfaces 33 and 34 fully contact the surface of the brake drum or rotor to provide a firm connection between the drum or rotor and the improved wheel 30. The full contact also prevents distortion of the wheel 30 or canting of the wheel 30 relative to the brake drum or rotor.

The improved wheel 30 can be formed by a conventional casting method, such as feeding a light weight molten metal, such as aluminum, magnesium or titanium, an alloy of a metal, or a polymer into a multi-piece mold (not shown). Alternatively, the wheel 30 can be forged by pressing a heated metal billet between a pair of dies. The resulting wheel is subsequently mounted upon a lathe for machining of the hub inboard surface 32 and a portion of the inside surface 11A of the wheel rim 11. When the hub inner surface 32 is machined, the lathe cuts the clearance groove 35 into the hub center 31. Thus, the same lathe used to finish the hub inner surface 32 is used to cut the clearance groove 35. This eliminates a separate machining step and the associated tooling required to machine the recesses 25 into the prior art wheel hub 15, as described above. Optionally, the lathe can cut the beveled groove sides 36 and 37. This avoids formation of burrs along the edges of the groove 35 that could interfere with the fit of the mounting surfaces 33 and 34 against a brake drum or axle hub.

Following finishing of the hub and rim inner surfaces 32 and 11A, the pilot hole 20 and stud holes 21 are drilled through the hub 31 from the outboard surface 19. The clearance groove 35 has sufficient width and depth to preclude an interference between the tinnerman nuts and the mounting surfaces 33 and 34 even if the circle 22 is eccentric to the clearance groove 35. Furthermore, the inventor has found that should the stud holes 21 be slightly offset from the circle 22, the stud holes 21 will appear to be symmetrically disposed within the clearance groove 35. This is not the case with the prior art wheel 10 wherein a slight eccentricity of the stud holes 21 relative to the recesses 25 may provide sufficient clearance for the tinnerman nuts, but would be visually objectionable. The outboard ends of the stud holes 21 are optionally counterbored and countersunk to accommodate the wheel nuts. Finally, a decorative coating can be applied to the outboard surface of the improved wheel.

It will be appreciated that some of the steps described above can occur in a different order. Furthermore, additional steps can be included or some of the steps described above can be deleted. For example, the outboard surface of the wheel 30 can be machined or polished instead of being coated.

An alternate process for forming the improved wheel 30 includes forming the clearance groove 35 when the wheel 30 is cast or forged by using an appropriately shaped mold or die (not shown). When the clearance groove 35 is cast or forged into the wheel hub 31, the groove 35 is made sufficiently wide to preclude any interference between the mounting surfaces 33 and 34 and a tinnerman nut due to eccentricity of the circle 22 relative to the clearance groove 31. During the machining of the resulting wheel, the stud holes 21 are drilled through the hub 31 equally spaced about a circle 22 which is concentric with the cast in clearance groove. Additionally, when the clearance groove 35 is cast or forged into the wheel hub 31, the weight of the wheel 30 can be reduced by machining the final shape of the groove.

Figure 9:
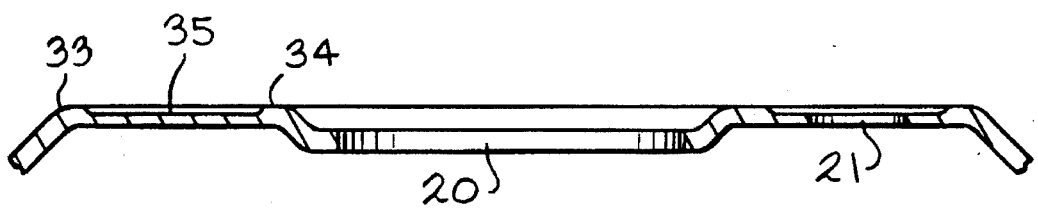
FIG. 9 is a fragmentary sectional view of a stamped wheel formed in accordance with the invention.
Figure 10:
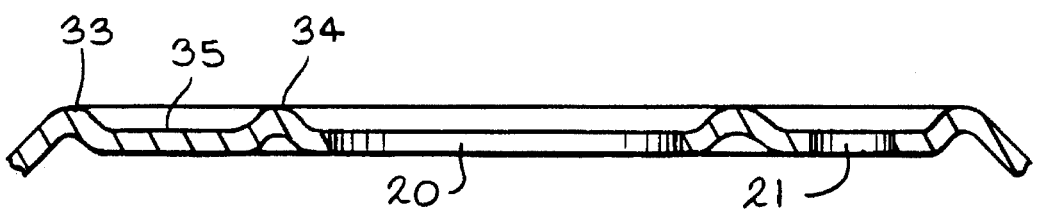
FIG. 10 is a fragmentary sectional view of an alternate embodiment of the stamped wheel shown in FIG. 9.

The present invention can also be practiced upon a fabricated wheel assembled from components stamped from a metal, such as steel, aluminum, magnesium or titanium, or an alloy thereof as shown in FIG. 9. The invention contemplates mounting the fabricated wheel upon a lathe and cutting a clearance ring into the inboard surface of the wheel hub. Alternatively, the clearance groove can be formed when the wheel disk is stamped as shown in FIG. 10. This allows use of a flat wheel hub, which may be desirable for certain wheel fasteners.

Figure 7:
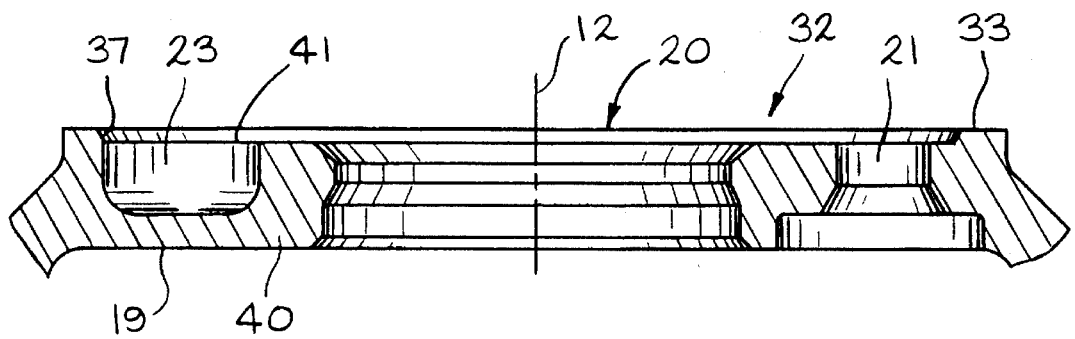
FIG. 7 is a fragmentary sectional view of a portion of a wheel hub illustrating an alternate embodiment of the invention.

A wheel hub center 40 which includes an alternate embodiment of the present invention is illustrated in FIG. 7. Portions of the hub center 40 which are the same as the hub center 32 shown in FIGS. 4 through 6 are labeled the same. In FIG. 7, the hub center 40 includes a cylindrical clearance recess 41 which is concentric with the wheel axis 12 and extends radially inwardly to the pilot hole 20. Thus, the hub 40 has one ring-shaped circumferential mounting surface 33.

Figure 8:
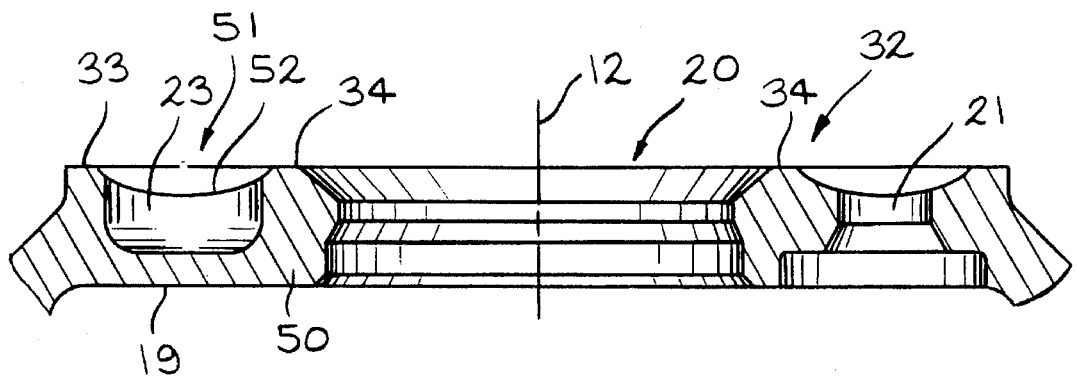
FIG. 8 is a fragmentary sectional view of a portion of a wheel hub illustrating another embodiment of the invention.

A wheel hub center 50 which includes another embodiment of the present invention is illustrated in FIG. 8. Portions of the hub center 50 which are the same as the hub center 32 shown in FIGS. 4 through 6 are labeled the same. In FIG. 8, the hub center 50 includes a clearance groove 51 having a dished bottom surface 52 which is not parallel to the mounting surfaces 33 and 34 and having a depth that is greater than the height of a tinnerman nut. It will be appreciated that the invention can be practiced using clearance grooves having other cross-sectional shapes than shown in the figures.

In accordance with the provisions of the patent statues, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle wheel including:

a wheel rim adapted for carrying a tire, said rim defining a wheel axis;

a wheel disk extending across said rim, said disk including a center hub, said hub having mounting surfaces formed perpendicular to said wheel axis, said mounting surfaces being adapted to abut a vehicle suspension component;

an annular recess formed between said hub mounting surfaces concentric with said wheel axis, said recess forming uninterrupted annular edges with said mounting surfaces; and a plurality of stud holes adapted for attaching the wheel to a vehicle extending through said hub, said stud holes being parallel to said wheel axis and equally circumferentially spaced about a circle disposed within said recess.

2. The vehicle wheel, as described in claim 1, wherein said circle disposed in said recess is concentric with said wheel axis.

3. The vehicle wheel, as described in claim 1 wherein said stud holes are radially centered within said recess.

4. The vehicle wheel, as described in claim 1, wherein said recess includes a beveled side.

5. The vehicle wheel, as described in claim 1, wherein said wheel disk is cast.

6. The vehicle wheel, as described in claim 1, wherein said wheel disk is forged.

7. The vehicle wheel, as described in claim 1, wherein said wheel disk is stamped.

8. A method for producing a vehicle wheel comprising the steps of:

(a) providing a vehicle wheel having a wheel rim which defines a wheel axis and a wheel disk formed across the wheel rim, the wheel disk having a central hub including mounting surfaces which are adapted to abut a vehicle suspension component and which are perpendicular to the wheel axis, the hub also having a plurality of stud holes formed therethrough; and (b) forming an annular recess in the wheel hub between the hub mounting surfaces which is concentric with the wheel axis and includes the inboard ends of the stud holes, the recess forming uninterrupted annular edges with the hub mounting surfaces.

9. The method for producing a vehicle wheel, according to claim 8, wherein step (b) includes using a lathe to cut the recess into the mounting surface of the wheel hub.

10. The method for producing a vehicle wheel, according to claim 8, wherein the recess is an annular groove.

11. The method for producing a vehicle wheel, according to claim 8, wherein step (a) includes casting the wheel.

12. The method for producing a vehicle wheel, according to claim 11, wherein step (b) is performed during the casting operation.

13. The method for producing a vehicle wheel, according to claim 12, wherein step (b) includes using a lathe subsequent to forming the annular recess to cut the final shape of the recess into the mounting surface of the wheel hub.

14. The method for producing a vehicle wheel, according to claim 8, wherein step (a) includes forging the wheel.

15. The method for producing a vehicle wheel, according to claim 14, wherein step (b) is performed during the forging operation.

16. The method for producing a vehicle wheel, according to claim 15, wherein step (b) includes using a lathe subsequent to forming the annular recess to cut the final shape of the recess into the mounting surface of the wheel hub.

17. The method for producing a vehicle wheel, according to claim 8, wherein step (a) includes stamping the wheel.

18. The method for producing a vehicle wheel, according to claim 17, wherein step (b) is performed during the stamping operation.

19. A vehicle wheel including:

a wheel rim adapted for carrying a tire, said rim defining a wheel axis;

a wheel disk extending across said rim, said disk having a center hub having an inboard surface, said hub including one and only one annular mounting surface formed on said inboard hub surface perpendicular to said wheel axis, said mounting surface being adapted to abut a vehicle suspension component;

a recess formed in said inboard hub surface adjacent to said mounting surface and concentric with said wheel axis, said recess forming an uninterrupted annular edge with said mounting surfaces; and a plurality of stud holes adapted for attaching the wheel to a vehicle extending through said hub, said stud holes being parallel to said wheel axis and equally circumferentially spaced about a circle disposed within said recess.

* * * * *